US010882071B2

(12) United States Patent
Marinel et al.

(10) Patent No.: US 10,882,071 B2
(45) Date of Patent: Jan. 5, 2021

(54) METHOD FOR THERMAL TREATMENT OF A SURFACE COATING ON A METAL PART BY MICROWAVES

(71) Applicants: Centre National de la Recherche Scientifique, Paris (FR); Ecole Nationale Supérieure d'Ingénieurs de Caen, Caen (FR)

(72) Inventors: Sylvain Marinel, Mathieu (FR); Etienne Savary, Caen (FR); Anthony Thuault, Valenciennes (FR); Romain Heuguet, Querqueville (FR)

(73) Assignees: CENTRE NATIONAL DE LA RECHERCHE SCIENTIFIQUE, Paris (FR); ECOLE NATIONALE SUPÉRIEURE D'INGÉNIEURS DE CAEN, Caen (FR)

( * ) Notice: Subject to any disclaimer, the term of this patent is extended or adjusted under 35 U.S.C. 154(b) by 175 days.

(21) Appl. No.: 15/561,884

(22) PCT Filed: Mar. 25, 2016

(86) PCT No.: PCT/EP2016/056737
§ 371 (c)(1),
(2) Date: Sep. 26, 2017

(87) PCT Pub. No.: WO2016/156275
PCT Pub. Date: Oct. 6, 2016

(65) Prior Publication Data
US 2018/0111157 A1 Apr. 26, 2018

(30) Foreign Application Priority Data
Mar. 27, 2015 (FR) ...................... 15 52629

(51) Int. Cl.
*B05D 3/02* (2006.01)
*H05B 6/64* (2006.01)
(Continued)

(52) U.S. Cl.
CPC .............. *B05D 3/029* (2013.01); *B01J 6/001* (2013.01); *B05D 3/0254* (2013.01); *C08J 3/247* (2013.01);
(Continued)

(58) Field of Classification Search
CPC ........ B05D 3/029; B05D 3/0254; C09D 5/24; C09D 5/26; C09D 5/32; H05B 6/80; H05B 6/6491; H05B 6/6455; B01J 6/001
(Continued)

(56) References Cited

U.S. PATENT DOCUMENTS 4,307,277 A  12/1981 Maeda et al.
6,163,020 A * 12/2000 Bartusch .............. H05B 6/6402
                                                      219/746
(Continued)

FOREIGN PATENT DOCUMENTS

DE  10 2006 010 220 A1   9/2006
EP       1 587 345 A2   10/2005
(Continued)

*Primary Examiner* — Michael P Wieczorek
(74) *Attorney, Agent, or Firm* — Baker & Hostetler LLP

(57) ABSTRACT

A process for treating a surface coating of a bulk metal part, comprises the steps of placing, in a cavity, at least one what is called metal part including what is called a surface coating that is able to absorb microwaves at the frequency $v_0$, the cavity being surrounded by one or a plurality of first susceptors the dimensions, material and arrangement of which are configured to screen the microwaves at the frequency $v_0$, in the vicinity of each the metal part, and in emitting the microwaves at the frequency $v_0$ into the cavity.

20 Claims, 4 Drawing Sheets

(51) Int. Cl.
*H05B 6/80* (2006.01)
*B01J 6/00* (2006.01)
*C09D 5/24* (2006.01)
*C09D 5/26* (2006.01)
*C09D 5/32* (2006.01)
*C09D 127/22* (2006.01)
*C09D 163/00* (2006.01)
*C08J 3/24* (2006.01)
*B29C 71/02* (2006.01)

(52) U.S. Cl.
CPC .................. *C08J 7/08* (2013.01); *C09D 5/24* (2013.01); *C09D 5/26* (2013.01); *C09D 5/32* (2013.01); *C09D 127/22* (2013.01); *C09D 163/00* (2013.01); *H05B 6/6455* (2013.01); *H05B 6/6491* (2013.01); *H05B 6/80* (2013.01); *B05D 2202/00* (2013.01); *C08J 2327/22* (2013.01); *C08J 2363/00* (2013.01)

(58) Field of Classification Search
USPC .................................. 427/595, 553, 557, 559
See application file for complete search history.

(56) References Cited

U.S. PATENT DOCUMENTS

| 7,217,909 | B2 * | 5/2007 | Fusejima | H05B 6/80 |
| | | | | 219/756 |
| 2005/0221017 | A1 | 10/2005 | Sklyarevich et al. | |
| 2006/0201935 | A1 | 9/2006 | Nishikawa | |
| 2009/0079101 | A1 | 3/2009 | Laubersheimer et al. | |
| 2010/0025395 | A1 * | 2/2010 | Laubersheimer | H05B 6/80 |
| | | | | 219/759 |

FOREIGN PATENT DOCUMENTS

| EP | 2 437 020 A1 | 4/2012 | |
| WO | 89/11771 A1 | 11/1989 | |
| WO | WO-2014008993 A1 * | 1/2014 | .............. B05D 3/029 |

* cited by examiner

METHOD FOR THERMAL TREATMENT OF A SURFACE COATING ON A METAL PART BY MICROWAVES

CROSS-REFERENCE TO RELATED APPLICATIONS

This application is a National Stage of International patent application PCT/EP2016/056737, filed on Mar. 25, 2016, which claims priority to foreign French patent application No. FR 1552629, filed on Mar. 27, 2015, the disclosures of which are incorporated by reference in their entirety.

FIELD OF THE INVENTION

The invention relates to devices and processes for heat treating coatings on a metal part.

BACKGROUND

Metal substrates or parts require surface treatments in many industrial applications. Metals may for example be treated to obtain nonstick properties (preventing adhesion during an interaction with foods, via fluoropolymers), in order to achieve resistance to various types of corrosion (mold, salinity, oxidation, etc.), in order to obtain specific mechanical properties such as resistance to various types of abrasion, or even to lubricate them and thus decrease friction during the production of dynamic metal systems.

The production of these surface treatments often requires a heat treatment of the coating on the metal part. This is for example the case of coatings made of fluoropolymers, and of epoxy coatings. It is also possible to envision covering a metal part with an oxide, which is often chemically stable and possesses specific electrical, mechanical or optical properties. This method often requires a heat treatment the temperature of which is very high.

The heat treatment of coatings on metal parts is carried out in the prior art by heating the part by convection or by induction. In the case of heating by convection, heat is transferred between a heat source and the sample to be treated by means of convection in the medium surrounding the sample. The heat source is generally an infrared-radiation emitting source, for example formed by an electrical transducer or by combustion of a gas. In the case of heating by induction, eddy currents heat the metal part to be treated, which must, in this case, preferably have ferromagnetic properties.

Microwave ovens may be an advantageous alternative to these two heat-treatment methods. When applied to the heating of non-metal materials, microwave ovens have a higher efficiency than that of the two methods described above, possibly leading to a significant saving in the power used in the case of convection ovens. This efficiency may be explained by a localized absorption of power within the sample and by the reduction in the total volume to be heated.

The heating of a coating on a dense bulk metal part is, in the prior art, incompatible with microwave heating. In a material, the length of penetration of an incident electromagnetic field is inversely proportional to the electrical conductivity of the material. Thus, the higher the electrical conductivity of a material, the more it will tend to reflect incident electromagnetic waves and in particular microwaves. Dense metals are opaque to and reflective of microwaves, because of their high electrical conductivity. Reflection of the electromagnetic field may cause a plasma to appear during a procedure for heating a coating on a metal substrate or a metal part. These plasmas appear when enough energy is delivered, to a gas for example, that a high temperature and an intense electromagnetic field are generated. The shape of a metal part, if it presents asperities or spikes (case of a metal part of complex shape) may promote the appearance of a plasma locally.

The appearance of a plasma has a dramatic effect on the heat treatment of a surface coating. Plasmas contain free charged particles, which are therefore very conductive, in their volume. A plasma also reflects incident electromagnetic fields. This plasma may result in a major disruption of the heating to the point that a rapid and significant decrease in the temperature of the sample results.

Moreover, the reflection of the electromagnetic field from dense bulk metal parts under high-microwave-power emission conditions may potentially cause an electric arc to form in a microwave cavity. This effect is facilitated by the presence of asperities and/or spikes on the bulk material. Such an arc may destroy the microwave heating device.

The invention aims to overcome at least one of the aforementioned drawbacks of the prior art.

SUMMARY OF THE INVENTION

One subject of the invention allowing this aim to be achieved is a process for treating a surface coating of a bulk metal part, comprising the steps consisting in:

placing, in a cavity, at least one what is called metal part including what is called a surface coating that is able to absorb microwaves at the frequency $v_0$, said cavity being surrounded by one or a plurality of first susceptors the dimensions, material and arrangement of which are configured to screen said microwaves at the frequency $v_0$, in the vicinity of each said metal part;

emitting said microwaves at the frequency $v_0$ into said cavity.

Advantageously, said material, arrangement and dimensions of said first susceptors partially screen said microwaves at the frequency $v_0$, in the vicinity of each said metal part, during the second step of the preceding process.

Advantageously, said arrangement of said one or more first susceptors forms a first volume bounded by said one or more first susceptors and in which the mean of the intensity of the electromagnetic field emitted during the second step of the preceding process, in the interior of said first volume is:

higher than 1%, preferably than 2% and preferably 5% of the mean of the intensity of the electromagnetic field on the exterior of said first volume in said cavity;

lower than 90% and preferably than 80% of the mean of the intensity of the electromagnetic field on the exterior of said first volume in said cavity.

Advantageously, said surface coating has an electrical conductivity lower than the electrical conductivity of the bulk material of each said metal part.

Advantageously, the preceding process is a process for calcinating a said coating.

Advantageously, the preceding process is a process for cross linking a said coating.

Advantageously, the preceding process also comprises a step consisting in measuring, during at least some of the step consisting in emitting said microwaves, the temperature of said coating, then in regulating the emission power of said microwaves depending on said measured temperature.

Advantageously, the preceding process also comprises a step consisting in placing said one or more first susceptors and said one or more metal parts in a first thermal confinement.

Advantageously, the preceding process also comprises a step consisting in surrounding said first thermal confinement with one or a plurality of second susceptors.

Advantageously, said arrangement of said one or more second susceptors forms a second volume bounded by said one or more second susceptors and in which the mean of the intensity of the electromagnetic field emitted during the second step of the preceding process, in the interior of said first volume is:

higher than 1%, preferably than 2% and preferably 5% of the mean of the intensity of the electromagnetic field on the exterior of said second volume in said cavity and lower than 90% and preferably than 80% of the mean of the intensity of the electromagnetic field on the exterior of said second volume in said cavity.

Advantageously, the preceding process also comprises a step consisting in placing said one or more second susceptors and said first thermal confinement in a second thermal confinement.

Advantageously, the process comprises a step consisting in causing a receptacle to move, said receptacle being arranged at least partially in the interior of said first volume bounded by said one or more first susceptors, so as to agitate at least one said bulk metal part in the interior of a receptacle.

Advantageously, said receptacle is a drum able to agitate at least one said bulk metal part by rotating.

Advantageously, the process comprises a step consisting in placing a plurality of said bulk metal parts in the vicinity of at least one third susceptor arranged in the interior of said first volume bounded by said one or more first susceptors.

Advantageously, the material of said one or more first or second susceptors is chosen from a refractory and semiconductor oxide of a transition metal, and a carbide.

Advantageously, the material of said one or more first or second susceptors is chosen from silicon carbide and lanthanum chromite.

BRIEF DESCRIPTION OF THE DRAWINGS

The invention will be better understood and other advantages, details and features thereof will become apparent from the following explanatory description, which is given by way of example with reference to the appended drawings, in which.

DETAILED DESCRIPTION

The following description presents a plurality of examples of embodiments of the device of the invention: these examples do not limit the scope of the invention. These examples of embodiments have both the essential features of the invention and additional features related to the embodiments in question. For the sake of clarity, elements that are the same have been given the same references in the various figures.

Figure 1:
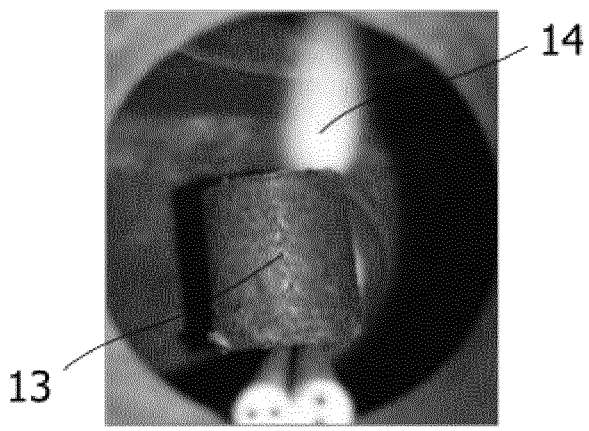
FIG. 1 is a photograph illustrating a technical problem of microwave heat treatments in a different case of the prior art.

FIG. 1 is a photograph illustrating a technical problem of heat treating with microwaves 1 in a different case of the prior art. It presents the heat treatment of a sample 13 made of silicon carbide (different from a bulk metal part 4) in a cavity 9 into which the microwaves 1 are emitted, leading to an intensity of the electromagnetic field which is much higher than under the conditions of the invention. During the treatment corresponding to the photograph, the formation of a plasma 14 is observed on a corner of the sample 13.

Two factors mainly allow an amount of energy favorable to the initiation of a plasma 14 to be reached locally: temperature and electromagnetic-field intensity. These two elements are favored during the treatment photographed in FIG. 1 of a sample 13. The asperities of the sample 13, or its shape, may promote spike effects. By heating and by emitting microwaves 1, plasmas 14 may be created locally on asperities or spikes. This technical problem is largely amplified during the treatment of a bulk metal part 4: the part 4 reflects the microwaves 1 and favors the creation of local energy-density maxima, resulting in the creation of a plasma 14 and preventing the heat treatment of metal samples.

Figure 2:
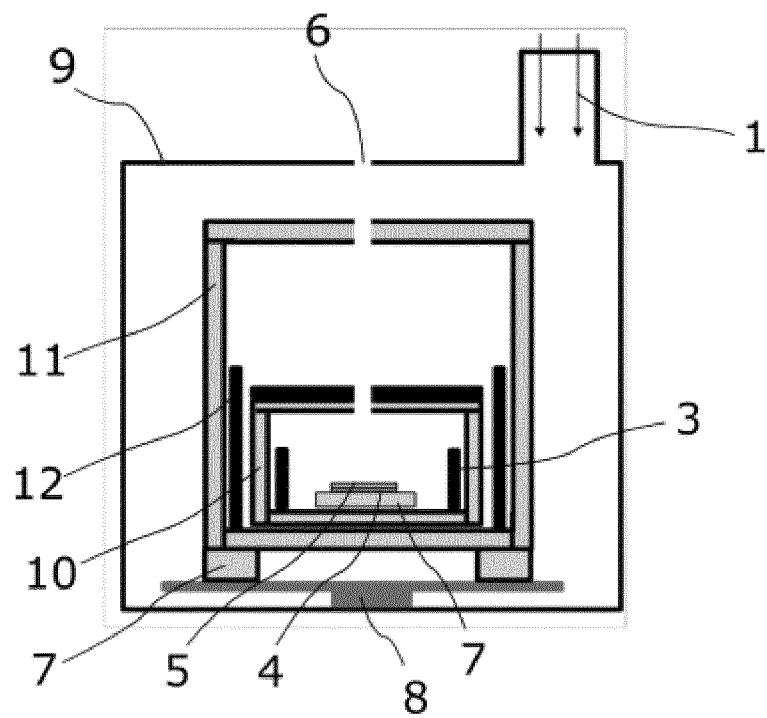
FIG. 2 is a schematic representation of the cross section of a device used to carry out the process of the invention.

FIG. 2 is a schematic representation of the cross section of a device used for carrying out the process of the invention. In this particular embodiment of the invention, the bulk metal part 4 possesses a coating 5, deposited on its upper portion. The bulk metal part 4 is placed on a holder made from a thermal insulator 7. The metal part 4 may have various shapes: it may for example be a cylindrical substrate. The presence of asperities or spikes on its surface is possible. In one particular embodiment of the invention, the thermal insulator 7 may for example be the thermal insulator 7 liteCell (AET Technologies, thermal insulator of high alumina content).

The metal part 4 is surrounded by a first susceptor 3, two slices of which appear in the cross section illustrating this embodiment of the invention. In other embodiments of the invention, a plurality of first susceptors 3 may surround the metal part 4.

The dimensions, the material and the arrangement of the one or more first susceptors 3 are chosen, or configured, to at least partially screen the microwaves at the frequency $v_0$, in the vicinity of each said metal part.

By the use of the term "in the vicinity", what is meant is a length smaller than the characteristic length of one or a plurality of metal parts 4.

Generally, by "microwaves" what is considered are waves the frequency of which is comprised between 300 MHz and 300 GHz. In practice, microwaves will advantageously be considered to be waves the frequency of which is comprised between 900 MHz and 6 GHz.

A susceptor is a material capable of an excellent absorption of the radiation of the microwaves 1 at a given frequency. During the absorption of this radiation, the susceptor material may re-emit the absorbed energy via infrared radiation 2 for example. The absorption of a susceptor material is governed by high dielectric, electric or magnetic losses during the excitation of the material by an electromagnetic field, as for example in the case of the microwaves 1. The materials used as susceptors in the embodiments of the invention may be silicon carbide (SiC), lanthanum chromite ($LaCrO_3$). Other materials with high capacities to absorb microwaves 1 may be used. Materials including a refractory and semiconductor oxide of a transition metal may be used. It is also possible to use materials composed of carbides, such as boron carbide for example.

The local absorption of the microwaves 1 allows, depending on the arrangement of the various susceptors, a volume to be configured in which the electromagnetic field is screened.

In this embodiment of the invention, the assembly formed by the metal part 4 and its coating 5, the holder made of thermal insulator 7 and the first susceptor 3 surrounding the metal part 4, is surrounded by a wall of a first thermal confinement 10 made of thermal insulator 7. In one particular embodiment of the invention, the thermal insulator 7 may for example be the thermal insulator 7 liteCell (AET Technologies S.A.S., thermal insulator of high alumina content). This confinement by a thermal insulator 7 allows the losses of energy by radiation during the heat treatment to be limited.

In the embodiment of the invention presented in FIG. 2, one or a plurality of second susceptors 12 are placed around the first thermal confinement 10. The assembly composed of the second susceptors 12 and the first thermal confinement 10 is surrounded by a second thermal confinement 11, made of thermal insulator 7. This structure allows both the thermal-confinement properties and the local reduction in the electromagnetic field to be increased. In this particular embodiment of the invention, the second thermal confinement 11 is made from the thermal insulator 7 Quartzel (registered trademark, Saint-Gobain Quartz S.A.S.).

In the particular embodiment presented in FIG. 2, the second thermal confinement 11 is placed on a platen made of aluminum.

All of the elements described in FIG. 2 are placed in a cavity 9. Microwaves 1 are emitted into an input of the cavity 9 by an emitter. In one particular embodiment of the invention, the microwave emitter 1 may be a magnetron. In one particular embodiment of the invention, the microwaves 1 are emitted at the frequency $v_0=2.45$ GHz.

The cavity 9, the first thermal confinement 10, the second thermal confinement 11 and the second susceptor 12 may be drilled in order to allow a pyrometric line of sight 6. This line of sight 6 may allow a temperature sensor to remotely measure the temperature of a metal part 4 or a coating 5 during a heat treatment. In one particular embodiment of the invention, the temperature sensor and the microwave emitter 1 are connected by way of a bus to a processing unit. The processing unit includes one or more microprocessors and a memory. The processing unit allows the emission power of the microwave emitter to be independently controlled and the data of the temperature sensor to be processed. In particular embodiments of the invention, the power is automatically controlled to a given temperature set point. The temperature set point may vary over time so as to achieve defined treatment-temperature profiles, such as temperature ramps or heat treatments at stationary temperature.

During the development of the process of the invention, the geometry, arrangement and materials of the first susceptors 3 surrounding the bulk metal part 4 and allowing it to be screened, were found via successive and iterative trials. They may also be approximated via numerical modelling using the finite-element process.

In one particular embodiment of the invention, the screening of a metal part 4 may be partial. The utility of partial screening of a metal part 4 is explained in the description of the following figures. In particular embodiments of the invention, the arrangement of the one or more first susceptors 3 forms a volume bounded by the one or more first susceptors 3. The average of the intensity of the electromagnetic field during the emission of microwaves 1 into the interior of the volume may be:

higher than 1%, preferably than 2% and preferably than 5% of the average of the intensity of the electromagnetic field on the exterior of said volume in the cavity 9 and lower than 90% and preferably than 80% of the average of the intensity of the electromagnetic field on the exterior of the volume in the cavity 9.

In another particular embodiment of the invention, the partial screening of a metal part 4 may be achieved via the combined effect of the one or more first susceptors 3 and the one or more second susceptors 12. In this embodiment, the arrangement of the one or more second susceptors 12 forms a volume bounded by the one or more second susceptors 12. The average of the intensity of the electromagnetic field during the emission of microwaves 1 into the interior of the volume bounded beforehand by the one or more first susceptors 3 may be:

higher than 1%, preferably than 2% and preferably than 5% of the average of the intensity of the electromagnetic field on the exterior of the volume bounded by the one or more second susceptors 12 in the cavity 9 and lower than 90% and preferably than 80% of the average of the intensity of the electromagnetic field on the exterior of the volume bounded by the one or more second susceptors 12 in the cavity 9.

Figure 3:
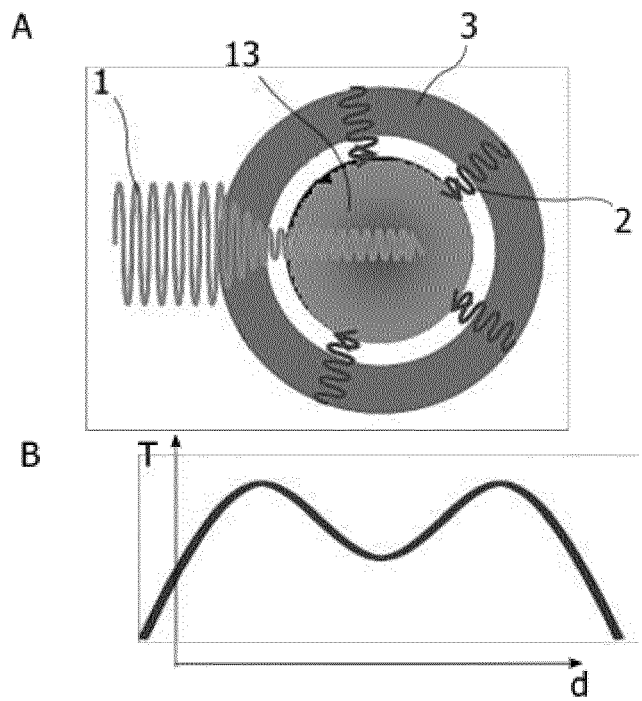
FIG. 3 is a schematic representation of an indirect heating process that is different from the invention.

FIG. 3 is a schematic representation of an indirect heating method that is different from the invention. Part A of FIG. 3 is a schematic representation of a top view of the implementation of an indirect heating operation.

The implementation of the indirect heating operation includes the use of a first susceptor 3 and a sample 13 surrounded by the first susceptor 3. In the case of the indirect heating operation, the material from which the sample 13 to be heated is made is transparent to the microwaves 1 or opaque to the microwaves 1.

The term "transparent" defines a material the dielectric and/or magnetic losses of which are substantially zero when the material is subjected to a microwave field 1 at a given frequency. A transparent material generally possesses a very low electrical conductivity. The electrical conductivity of a transparent material may be lower than $10^{-8}$ S·m$^{-1}$, preferably lower than $10^{-10}$ s·m$^{-1}$ and more preferably lower than $10^{-12}$ S·m$^{-1}$.

The term "opaque" defines a material that is reflective to the radiation of the microwaves 1 at a given frequency. An opaque material in general possesses a high electrical conductivity. The electrical conductivity of an opaque material is preferably higher than $10^3$ S·m$^{-1}$. In this implementation, which is different from that of the invention, the interaction between the microwaves 1 and the sample 13 does not allow the temperature of the sample 13 to increase. In contrast, the susceptor 3 placed around the sample 13 absorbs the microwaves 1 and emits infrared radiation 2. The sample may then be heated by the infrared radiation 2.

Part B of FIG. 3 schematically illustrates a temperature profile along an axis passing through the center of the sample 13. The two temperature maxima of this implementation are located at the distance (indicated by the abscissa d) of the location of the first susceptor 3. The temperature at the center of the sample is due to heating by infrared radiation 2 of the periphery of the sample coupled with thermal conduction within the sample as explained above.

This implementation does not allow the technical problem posed by the prior art to be solved. On the one hand, the sample 13 is heated by infrared radiation 2 originating from the first susceptor 3: it is thus for example impossible to selectively heat a surface coating 5 to a temperature substantially higher than that of the metal part 4. On the other hand, this embodiment heats the sample indirectly. In this embodiment, a significant portion of the efficiency enabled by heating with the microwaves 1 is lost.

Figure 4:
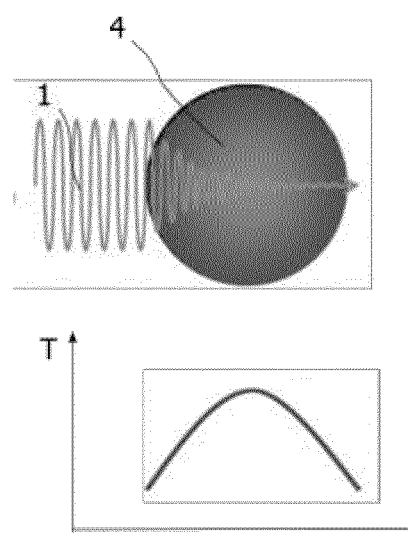
FIG. 4 is a schematic representation of a direct heating process that is different from the invention.

FIG. 4 is a schematic representation of a direct heating process that is different from the invention. Part A of FIG. 3 is a schematic representation of a top view of the implementation of a direct heating operation. In the case of direct heating, the material from which the sample 13 to be heated is made absorbs the microwaves 1 at a given frequency. The interaction between the microwaves 1 and the absorbent material of the sample 13 allows the sample to be heated.

Part B of FIG. 4 schematically illustrates a temperature profile along an axis passing through the center of the sample 13. In this implementation, which is different from the invention, the temperature profile has a maximum at the center of the sample. The profile may be different because it in particular depends on the size of the sample 13, on the material of the sample 13, and on the power and wavelength of the emitted microwaves 1.

This implementation does not allow the technical problem posed by the prior art to be solved. In the case of a sample 13 including a bulk metal part 4 and its surface coating 5, the power of the emitted microwaves 1 that is required for the heat treatment of the surface coating 5 may cause a plasma 14 to appear in the vicinity of the sample 13 and/or an electric arc in the cavity 9.

Figure 5:
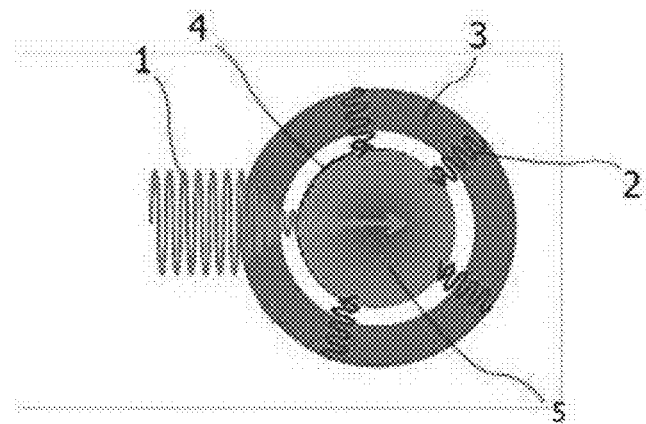
FIG. 5 is a schematic representation of a hybrid heating process according to one embodiment of the invention.

FIG. 5 is a schematic representation of a hybrid heating process according to one embodiment of the invention. Part A of FIG. 4 is a schematic representation of a top view of the implementation of a hybrid heating operation. The implementation of this embodiment of the invention includes a sample 13 comprising a metal part 4 (which cannot be seen in the top view in FIG. 5) covered with a surface coating 5. The sample is surrounded by a first susceptor 3. In this embodiment of the invention, the susceptor 3 absorbs, at a given frequency, the microwaves 1. In the vicinity of the sample 13, the field of the microwaves 1 may then be partially screened. The susceptor in this case emits infrared radiation 2 that contributes to the heat treatment of the coating 5. Furthermore, the portion of the microwaves 1 that is not screened in the vicinity of the sample 13 may be absorbed, at a given frequency, by the coating 5. This portion of the microwaves 1 is in contrast not absorbed by the part 4. Specifically, the metallic character of the metal part makes it opaque to the microwave radiation 1. This hybrid process allows the coating to be heated by the contribution of the infrared radiation and by the contribution of the microwave radiation 1, without causing a plasma 14 to form in the vicinity of the metal part 4.

Figure 6:
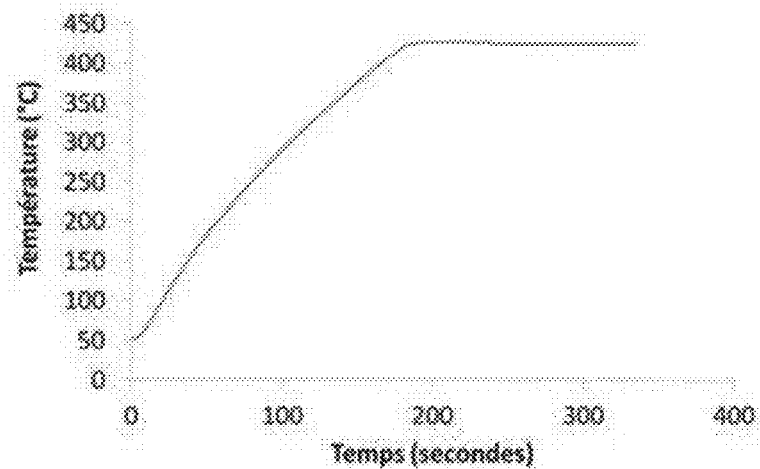
FIG. 6 illustrates the behavior of the temperature of the metal part 4 during a microwave heat treatment according to the embodiment of the invention described in FIG. 2.

FIG. 6 illustrates the variation in the temperature of the metal part 4 during a heat treatment with microwaves 1 according to the embodiment of the invention illustrated in FIG. 2. The temperatures of FIG. 6 were measured with an infrared temperature sensor using the pyrometric line of sight 6 to capture the infrared spectrum of the coating 5. The heat treatment was carried out in two phases. In the first phase, the emission power of the microwaves 1 was kept constant (in this particular embodiment of the invention, the power of the emitter of the microwaves 1 was 6000 W in the first phase). The temperature of the sample increased to a setpoint value of 425° C. in less than 3 minutes. Approximating the increase in temperature of the sample in this first phase as a straight line, the slope of the variation was about 130° C.·min$^{-1}$. In the second phase, the power was adjusted by the treating unit to maintain a constant temperature of 425° C. (temperature plateau). This temperature was maintained for 2 minutes and 30 seconds. The variation does not include a downward ramp in temperature because the metal part 4 was removed from the microwave oven as soon as the second phase had ended. Specifically, at the end of the plateau the microwave power was turned off, thus allowing the cavity 9 to be opened.

Figure 7:
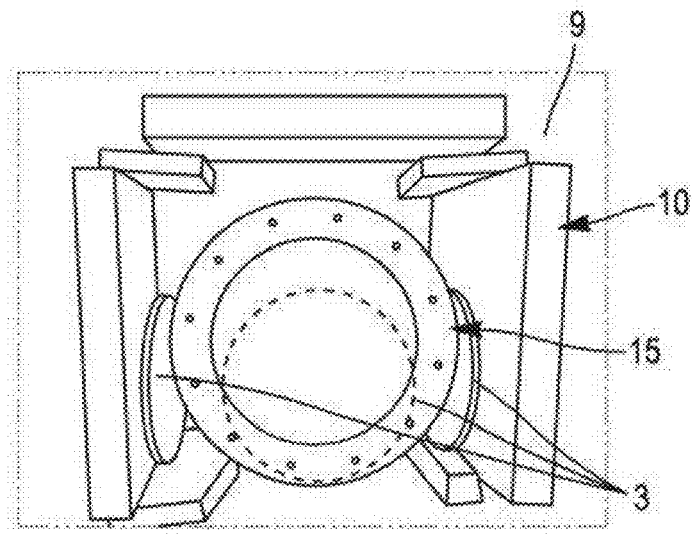
FIG. 7 is a photograph of a device used to implement a process according to the invention.

FIG. 7 is a photograph of a device used to implement a process according to the invention. The device used includes a receptacle 15 able to contain one or more bulk metal parts 4. The receptacle 15 is placed, at least partially, in the interior of the first volume bounded by said one or more first susceptors 3. In the example illustrated in FIG. 7, the receptacle 15 is a drum, made of grilled metal, surrounded by a plurality of first susceptors 3. The photograph of FIG. 7 shows a device from which a first susceptor 3 (symbolized by the black dashed line) and a wall of a first thermal confinement 10 have been removed for the sake of clarity of the illustration.

The receptacle 15 may be made to move in one embodiment of the process according to the invention, for example by means of a motor placed in the interior or on the exterior of the cavity 9. The receptacle 15 is made to move so as to agitate at least one bulk metal part 4, which is placed in the interior of the receptacle 15, during the process. The agitation of the one or more bulk metal parts 4 allows the arrangement of said parts 4 to be changed with respect to the microwave field and/or to the temperature distribution in the receptacle 15. If the microwave field and/or the spatial temperature distribution is not uniform, this agitation may allow various bulk metal parts 4 and/or of the coating of various bulk metal parts 4 to be treated more uniformly.

The receptacle 15 may be a metal drum, as illustrated in FIG. 7. In this example, the drum is made of steel and drilled. The heat treatment may cause the one or more bulk metal parts 4 to outgas: the holes allow this gas to be convected into the cavity 9 without being confined in the receptacle 15.

The drum may rotate about itself in order to agitate the one or more bulk metal parts 4 that it contains. The rotation may occur about an axis of symmetry of the drum.

The various bulk metal parts 4 may be agitated during the emission of the microwaves or indeed between steps of emission of microwaves. A succession of steps in which microwaves are emitted and the receptacle 15 is made to move may be advantageous: the agitation and making of contact of a plurality of bulk metal parts 4 during the emission of microwaves may result in the creation of electrical arcs between certain parts 4. This effect may be avoided by agitating the parts 4 during a stoppage of the emission of microwaves. The step in which the receptacle 15 is made to move may last a few seconds. The duration of this step is small with respect to the duration of a typical heat treatment (typically longer than 100 seconds) and disrupts only little the heat treatment of the parts 4.

Figure 8:
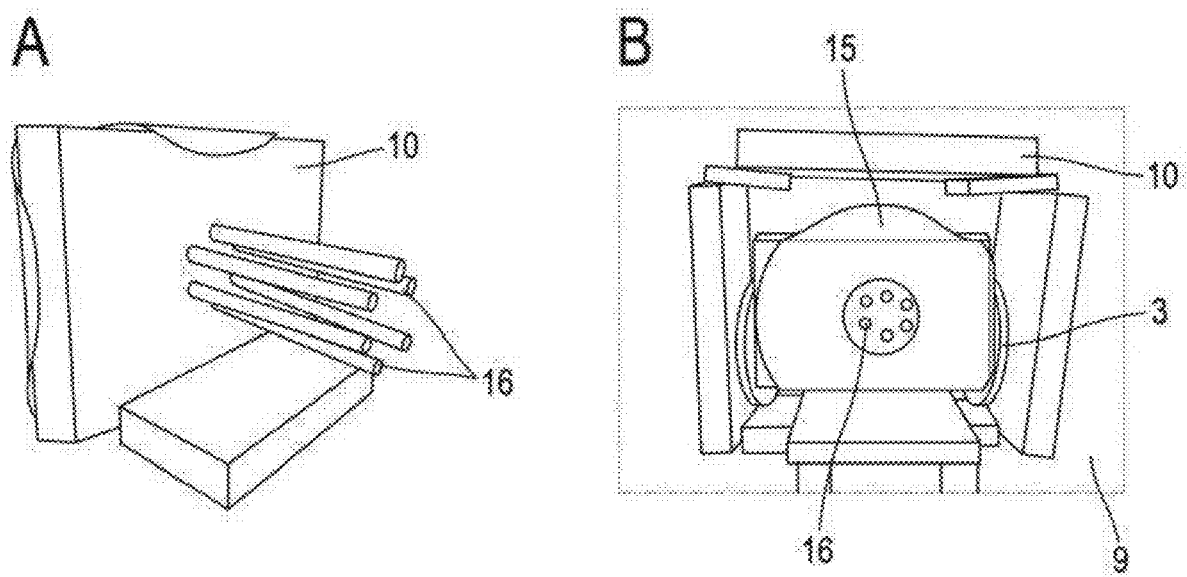
FIG. 8 is a set of photographs of a device used to implement a process according to the invention.

FIG. 8 is a set of photographs of a device used for the implementation of a process according to the invention. Part A of FIG. 8 is a photograph illustrating a set of third susceptors 16 that are securely joined to the wall of a first thermal confinement 10. Part B of FIG. 8 is a photograph illustrating a device suitable for implementing a process according to the invention, including a plurality of third susceptors 16 that are arranged in the first volume bounded by the first susceptors 3. Those portions of the third susceptors 16 which may be seen in part A of FIG. 8 are, when the process is being carried out, inserted into the volume of the receptacle 15, as illustrated in part B of FIG. 8. More generally, a plurality of bulk metal parts 4 is placed in the vicinity of at least one third susceptor 16. These parts 4 may be either placed on a holder or in a movable receptacle 15. The inventors have discovered that this configuration results in a rapider variation in the temperature of the coating of the parts 4. In the configuration of the device illustrated in part B of FIG. 8, six bars made of silicon carbide correspond to the third susceptors 16. In the process, the metal parts 4 may be placed between or around these bars. The number and arrangement of the third susceptors 16 does not completely screen the microwave field: the heat treatment of the coating of the bulk metal parts 4 results from a combination of the absorption of the microwaves by the one or more coatings and the transfer of heat from the susceptors to the one or more coatings.

The invention claimed is:

1. A process for treating a surface coating of a bulk metal part, comprising the steps of:
   1) placing, in a cavity, at least one bulk metal part including a surface coating able to absorb microwaves at the frequency $v_0$, said cavity being directly surrounded by one or a plurality of first susceptors having dimensions, material, and an arrangement of which are configured to screen said microwaves at the frequency $v_0$, in the vicinity of each said bulk metal part;
   2) emitting said microwaves at the frequency $v_0$ into said cavity;
   3) placing said one or plurality of first susceptors and said at least one bulk metal part in a first thermal confinement; and
   4) surrounding said first thermal confinement with one or a plurality of second susceptors.

2. The process as claimed in claim 1, wherein said material, arrangement and dimensions of said one or a plurality of first susceptors partially screen said microwaves at the frequency $v_0$, in the vicinity of each said bulk metal part, during the second step of claim 1.

3. The process as claimed in claim 2, wherein said arrangement of said one or a plurality of first susceptors forms a first volume and wherein the average of the intensity of the electromagnetic field emitted during the emitting of said microwaves at the frequency $v_0$ in an interior of said first volume is:
   higher than 1% of the average of the intensity of the electromagnetic field on an exterior of said first volume and
   lower than 90% of the average of the intensity of the electromagnetic field on the exterior of said first volume.

4. The process as claimed in claim 3, comprising a step of causing a receptacle to move, said receptacle being arranged at least partially in the interior of the first volume bounded by said one or a plurality of first susceptors, so as to agitate at least one said bulk metal part in the interior of the receptacle.

5. The process as claimed in claim 4, wherein said receptacle is a drum able to agitate at least one said bulk metal part by rotating.

6. The process as claimed in claim 3, wherein the average of the intensity of the electromagnetic field emitted during the emitting of said microwaves ate the frequency $v_0$ into said cavity, in the interior of said first volume is higher than 2% of the average of the intensity of the electromagnetic field on the exterior of said first volume in said cavity.

7. The process as claimed in claim 3, wherein the average of the intensity of the electromagnetic field emitted during the emitting of said microwaves at the frequency $v_0$ into said cavity, in the interior of said first volume is higher than 5% of the average of the intensity of the electromagnetic field on the exterior of said first volume in said cavity.

8. The process as claimed in claim 3, wherein the average of the intensity of the electromagnetic field emitted during the emitting of said microwaves at the frequency $v_0$ into said cavity, in the interior of said first volume is lower than 80% of the average of the intensity of the electromagnetic field on the exterior of said first volume in said cavity.

9. The process as claimed in claim 1, wherein said surface coating has an electrical conductivity lower than the electrical conductivity of a bulk material of each said bulk metal part.

10. The process as claimed in claim 1, further comprising a step of measuring, during at least some of the step comprising emitting said microwaves, the temperature of said coating, then regulating the emission power of said microwaves depending on said measured temperature.

11. The process as claimed in claim 1, wherein said arrangement of said one or a plurality of second susceptors forms a second volume bounded by said one or a plurality of second susceptors and wherein the average of the intensity of the electromagnetic field emitted during the emitting of said microwaves at the frequency $v_0$, in the interior of said second volume is: higher than 1% of the average of the intensity of the electromagnetic field on the exterior of said second volume and lower than 90% of the average of the intensity of the electromagnetic field on the exterior of said second volume.

12. The process as claimed in claim 11, comprising a step of placing a plurality of at least one bulk metal part in the vicinity of one or a plurality of third susceptors arranged in an interior of the first volume bounded by said one or a plurality of first susceptors.

13. The process as claimed in claim 12, wherein the material of said one or a plurality of first susceptors, and a material of said one or a plurality of second susceptors and a material of said one or a plurality of third susceptors is chosen from a refractory and semiconductor oxide of a transition metal, and a carbide.

14. The process as claimed in claim 12, wherein the material of said one or a plurality of first susceptors, and a material of said one or a plurality of second susceptors and a material of said one or a plurality of third susceptors is chosen from silicon carbide and lanthanum chromite.

15. The process as claimed in claim 11, wherein the average of the intensity of the electromagnetic field emitted during the emitting of said microwaves at the frequency no into said cavity, in the interior of said first volume is higher than 2% of the average of the intensity of the electromagnetic field on the exterior of the second volume.

16. The process as claimed in claim 11, wherein the average of the intensity of the electromagnetic field emitted during the emitting of said microwaves at the frequency $v_0$ into said cavity, in the interior of said first volume is higher than 5% of the average of the intensity of the electromagnetic field on the exterior of the second volume.

17. The process as claimed in claim 11, wherein the average of the intensity of the electromagnetic field emitted during the emitting of said microwaves at the frequency $v_0$ into said cavity, in the interior of said first volume is lower than 80% of the average of the intensity of the electromagnetic field on the exterior of the second volume.

18. The process as claimed in claim 1, comprising a step of placing said one or a plurality of second susceptors and said first thermal confinement in a second thermal confinement.

19. A process for calcinating said coating as claimed in claim 1.

20. A process for cross linking said coating as claimed in claim 1.

* * * * *